United States Patent
Koperski et al.

(10) Patent No.: US 11,055,538 B2
(45) Date of Patent: Jul. 6, 2021

(54) OBJECT RE-IDENTIFICATION WITH TEMPORAL CONTEXT

(71) Applicant: Disney Enterprises, Inc., Burbank, CA (US)

(72) Inventors: Michal Koperski, Juan-les-Pins (FR); Slawomir W. Bak, Pittsburgh, PA (US); G. Peter K. Carr, Allison Park, PA (US)

(73) Assignee: Disney Enterprises, Inc., Burbank, CA (US)

( * ) Notice: Subject to any disclaimer, the term of this patent is extended or adjusted under 35 U.S.C. 154(b) by 494 days.

(21) Appl. No.: 15/476,230

(22) Filed: Mar. 31, 2017

(65) Prior Publication Data

US 2018/0286081 A1 Oct. 4, 2018

(51) Int. Cl.
*G06K 9/62* (2006.01)
*G06K 9/00* (2006.01)
*G06T 7/292* (2017.01)

(52) U.S. Cl.
CPC .......... *G06K 9/00771* (2013.01); *G06T 7/292* (2017.01); *G06K 9/6215* (2013.01); *G06K 9/6218* (2013.01)

(58) Field of Classification Search
CPC .. G06K 9/6212; G06K 9/6215; G06K 9/4676; G06K 9/6262; G06K 9/6263; G06K 9/00771; G06K 9/00778; G06K 9/00785; G06T 7/292; G06T 2207/30232;
(Continued)

(56) References Cited

U.S. PATENT DOCUMENTS

| 2010/0111370 | A1* | 5/2010 | Black | G06K 9/00369 382/111 |
| 2015/0248587 | A1* | 9/2015 | Oami | G06K 9/00771 382/103 |
| 2016/0155020 | A1* | 6/2016 | Tariq | G06K 9/00771 382/105 |

FOREIGN PATENT DOCUMENTS

EP 1556805 * 8/2011 ............... G06K 9/32

OTHER PUBLICATIONS

Chu et al.,"Tracking Across Nonoverlapping Cameras Based On The Unsupervised Learning Of Camera Link Models", Nov. 2012, IEEE, 2012 6th Int. Conf. on Distributed Smart Cameras, p. 1-6. (Year: 2012).*

(Continued)

*Primary Examiner* — Vincent Rudolph
*Assistant Examiner* — Timothy Choi
(74) *Attorney, Agent, or Firm* — Patterson + Sheridan, LLP (57) ABSTRACT

Techniques for object re-identification based on temporal context. Embodiments extract, from a first image corresponding to a first camera device and a second image corresponding to a second camera device, a first plurality of patch descriptors and a second plurality of patch descriptors, respectively. A measure of visual similarity between the first image and the second image is computed, based on the first plurality of patch descriptors and the second plurality of patch descriptors. A temporal cost between the first image and the second image is computed, based on a first timestamp at which the first image was captured and a second timestamp at which the second image was captured. The measure of visual similarity and the temporal cost are combined into a single cost function, and embodiments (Continued)

determine whether the first image and the second image depict a common object, using the single cost function.

20 Claims, 6 Drawing Sheets

(58) Field of Classification Search
CPC . G06T 2207/30236; G06T 2207/30241; G06T 2207/10016
See application file for complete search history.

(56) References Cited

OTHER PUBLICATIONS

Perronnin et al., "Fisher Kernels on Visual Vocabularies for Image Categorization", Jun. 2007, IEEE, 2007 IEEE Conf. on Computer Vision and Pattern Recognition, p. 1-8. (Year: 2007).*
Martinel et al., "Classification of Local Eigen-Dissimilarities for Person Re-Identification", Apr. 2015, IEEE, IEEE Signal Processing Letters, vol. 22, No. 4, p. 455-459. (Year: 2015).*
Wu et al., "Asymmetric Support Vector Machines: Low False-Positive Learning Under the User Tolerance", Aug. 2008, ACM, Proceedings of the 14th ACM SIGKDD Int. Conf. on Knowledge Discovery and Data Mining, p. 749-757. (Year: 2008).*
Gang et al., "Improved Bags-of-Words Algorithm for Scene Recognition", Mar. 2012, Elsevier, Physics Procedia, vol. 24, part B, p. 1255-1261. (Year: 2012).*
Gilbert et al., "Incremental, scalable tracking of objects inter camera", Jul. 2008, Elsevier, Computer Vision and Image Understanding, vol. 111, iss. 1, p. 43-58. (Year: 2008).*
Cong et al., "Video Sequences Association for People Re-identification across Multiple Non-overlapping Cameras", Sep. 2009, Springer-Verlag, 15th Int. Conference on Image Analysis and Processing, p. 179-189. (Year: 2009).*
Zhang et al., "A Novel Visual Word Co-occurrence Model for Person Re-identification", Mar. 2015, Springer, European Conference on Computer Vision 2014, p. 122-133. (Year: 2015).*
Marx et al., "Coupled Clustering: A Method for Detecting Structural Correspondence", Mar. 2003, ACM, Journal of Machine Learning Research, vol. 3, p. 747-780. (Year: 2003).*
Zhao et al., "Online learning of dynamic multi-view gallery for person Re-identification", Nov. 2015, Springer, Science + Business Media, Multimedia Tools and Applications, vol. 76, p. 217-241. (Year: 2015).*
Pedagadi et al., "Local Fisher Discriminant Analysis for Pedestrian Re-identification", Jun. 2013, IEEE, 2013 IEEE Conference on Computer Vision and Pattern Recognition, p. 3318-3325. (Year: 2013).*
Ma et al., "BiCov: a novel image representation for person re-identification and face verification", Sep. 2012, BMVC, <https://hal.archives-ouvertes.fr/hal-00806112>, p. 1-11. (Year: 2012).*
Zheng et al., "Person Re-identification by Probabilistic Relative Distance Comparison", Jun. 2011, IEEE, CVPR 2011, p. 649-656. (Year: 2011).*
Benfold, B. et al., "Stable Multi-Target Tracking in Real-Time Surveillance Video", IEEE Conference on Computer Vision and Pattern Recognition (CVPR), Jun. 20-25, 2011, 8 pages.
Csurka, G., et al. "Visual Categorization with Bags of Keypoints", ECCV International Workshop on Statistical Learning in Computer Vision, Prague, 2004, 16 pages.
Kostinger, M. et al., "Large Scale Metric Learning from Equivalence Constraints", IEEE Conference on Computer Vision and Pattern Recognition (CVPR), Jun. 16-21, 2012, 8 pages.
Liao, S. et al., "Person Re-identification by Local Maximal Occurrence Representation and Metric Learning", IEEE Conference on Computer Vision and Pattern Recognition (CVPR), 2015, pp. 2197-2206 <http://www.cv-foundation.org/openaccess/content_cvpr_2015/papers/Liao_Person_Re-Identification_by_2015_CVPR_paper.pdf>.
Perronnin, F., et al., "Large-Scale Image Retrieval with Compressed Fisher Vectors", IEEE Conference on Computer Vision and Pattern Recognition (CVPR), Jun. 13-18, 2010, 8 pages.
Sun, C., et al., "Vehicle Reidentification Using Multidetector Fusion", IEEE Transactions on Intelligent Transportation Systems, Sep. 3, 2004, vol. 5, Issue 3, pp. 155-164.
Zheng, W. et al., "Partial Person Re-identification", IEEE Conference on Computer Vision and Pattern Recognition (CVPR), 2015, pp. 4678-4686 (http://www.cv-foundation.org/openaccess/content_iccv_2015/papers/Zheng_Partial_Person_Re-Identification_ICCV_2015_paper.pdf>.

* cited by examiner

OBJECT RE-IDENTIFICATION WITH TEMPORAL CONTEXT

BACKGROUND

Field of the Invention

The present disclosure relates to digital image processing, and more specifically, to techniques for unsupervised learning for recognizing objects appearing across multiple, non-overlapping images.

Description of the Related Art

Object recognition is useful in many different fields. However, many conventional techniques require affirmative interaction with one or more electronic devices, and thus are ill-suited for situations in which objects such as people, animals, vehicles and other things are moving quickly through a location (e.g., an airport). Image processing techniques can be used to recognize objects within frames captured by a camera. One challenge when detecting objects across multiple cameras is handling variations in lighting, camera position and object pose across the cameras. For instance, an object may have a certain set of color characteristics as in an image captured by a first camera, and may be captured with different color characteristics in an image captured by a different camera. As a result, conventional techniques for determining that an object captured by multiple cameras are indeed the same object may be inaccurate.

SUMMARY

Embodiments provide a method, system and computer readable medium for re-identifying objects depicted in images captured by two non-overlapping cameras. A first image corresponding to a first camera and a second image corresponding to a second camera, a first plurality of patch descriptors and a second plurality of patch descriptors, respectively. The method, system and computer readable medium also include computing a measure of visual similarity between the first image and the second image, based on the first plurality of patch descriptors and the second plurality of patch descriptors. Additionally, the method, system and computer readable medium include computing a temporal cost between the first image and the second image, based on a first timestamp at which the first image was captured and a second timestamp at which the second image was captured. The method, system and computer readable medium further include combining the measure of visual similarity and the temporal cost into a single cost function. The method, system and computer readable medium also include determining whether the first image and the second image depict a common object, using the single cost function.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Object re-identification refers to the technical challenge of identifying when an object appearing in an image(s) captured using a first camera subsequently appears in an image(s) captured using a second, non-overlapping camera. Object re-identification is generally a challenging problem, not only due to significant changes in appearance caused by variations in illumination between various camera devices, the viewing angles of the camera devices, and the object's pose within the captured images, but also because of a large amount of occlusion and background clutter within the captured images.

Object re-identification approaches can generally be divided into unsupervised and supervised approaches. Unsupervised approaches focus on designing features (often handcrafted) that should be robust to changes in imaging conditions. On the other hand, supervised methods usually employ metric learning that uses training data to search for effective distance functions for comparing objects from different cameras. Supervised methods typically learn a trade-off between feature invariance and their discriminative power directly from data, thus achieving better performance than conventional unsupervised approaches. By maximizing inter-class variations and minimizing intra-class variations, such supervised learning techniques look for optimal feature embedding to then perform the object re-identification.

Many different machine learning algorithms can be used for learning a robust similarity function. Such algorithms may include, for example, feature selection and weighting, as well as defining the object re-identification as a ranking problem and using an ensemble of Ranking Support Vector Machines (SVMs). Ranking SVM refers to a variant of a Support Vector Machine configured for ranking elements of a data set based on attributes of the elements. Additionally, or alternatively the family of Mahalanobis distance functions can be used for learning a metric. A Mahalanobis distance can directly model the transition in feature space between two camera views, and thus may achieve better performance than the similarity functions directly learnt in the original feature space. Mahalanobis metric learning usually aims at improving k nearest neighbor (k-nn) classification by iteratively adapting the metric (e.g., Large Margin Nearest Neighbor Learning (LMNN), Information Theoretic Metric Learning (ITML), Logistic Discriminant Metric Learning (LDML)). Other algorithms include the Keep It Simple and Straightforward (KISS) metric which uses a statistical inference based on a likelihood-ratio test of two Gaussian distributions modeling positive and negative pairwise differences between features. The KISS metric has further been extended to linear and non-linear subspace embeddings. Mahalanobis metric learning approaches usually require hundreds of labeled image pairs to produce effective similarity measures.

For many geographic locations (e.g., an airport), objects (e.g., luggage, individuals) navigate the geographic location in a predictable movement pattern. As such, embodiments described herein can use these predictable movement patterns that exist in many surveillance scenarios to disambiguate between objects who otherwise have similar appearances. In airports, for example, objects tend to move from ticketing, through security, and then on to their boarding gate. As such, embodiments may generate a data model for object re-identification that considers not only the appearance of an object but also the object's temporal context. For example, embodiments may determine that two objects with similar appearances in captured images are the same object when the timestamps of the images sufficiently match the temporal context described by the data model, and may determine that two other objects having similar appearances in captured images are different objects, where the timestamps of the images are sufficiently outside the temporal context described by the data model. For example, if two camera devices on opposite sides of a large airport capture images that depict objects with similar appearances and the images are captured only 30 seconds apart, embodiments may determine that the objects depicted within the images are different objects, as the difference in timestamps is substantially disproportionate to the distance between the camera devices. Doing so provides a more accurate, unsupervised learning technique for object re-identification between multiple cameras.

Figure 1:
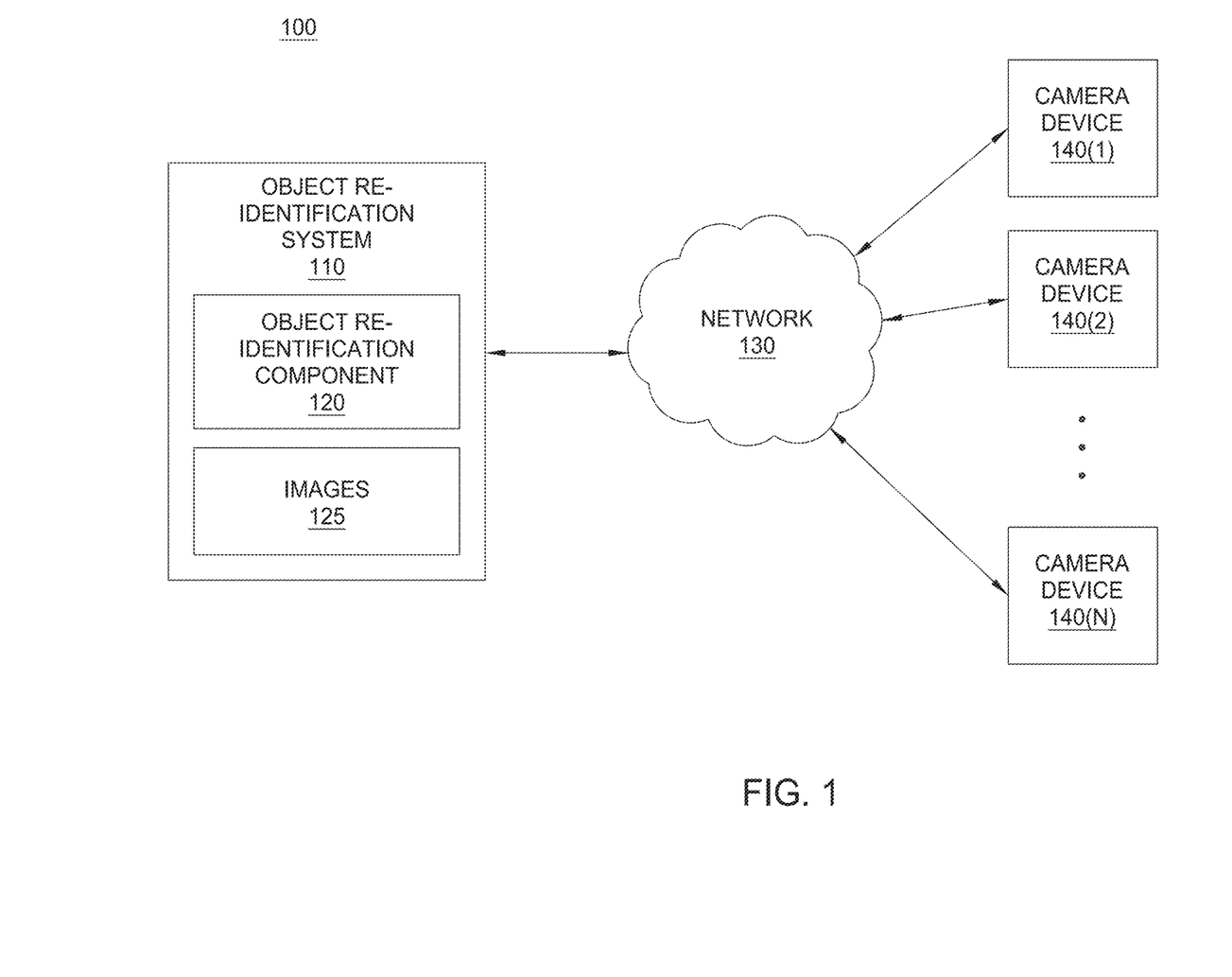
FIG. 1 is a system configured with an object re-identification component, according to one embodiment described herein.

FIG. 1 is a system configured with an object re-identification component, according to one embodiment described herein. As shown, the system 100 includes an object re-identification system 110, connected to a plurality of cameras 140(1)-(N) via a network 130. The object re-identification system 110 includes an object re-identification component 120 and images 125. Generally, the images 125 comprise data representing images captured using the cameras 140(1)-(N). In the example, the cameras 140(1)-(N) represent non-overlapping (i.e., images captured by different camera devices of the camera devices 140(1)-(N), where each camera captures images of a unique physical location) surveillance cameras positioned throughout a location (e.g., an airport). The network 130 generally represents any communications network (e.g., a wired communications network, a wireless communications network, etc.) suitable for transferring data between the camera devices 140(1)-(N) and the object re-identification system 110.

The object re-identification component 120 is generally configured to analyze the images 125 and to perform an object re-identification operation to determine when an object who appeared within one or more images captured by one of the camera devices 140(1)-(N) appears within one or more images captured by a different one of the camera devices 140(1)-(N). Generally, object re-identification across the camera devices 140(1)-(N) can be used for a number of purposes. For instance, the location of a particular object of interest could be tracked throughout the camera devices 140(1)-(N). As another example, the object re-identification component 120 could access data specifying the geographical locations of the camera devices 140(1)-(N), and the camera devices 140(1)-(N) could perform object re-identification techniques to track the flow of objects throughout a venue (e.g., an airport). Moreover, the object re-identification component 120 could use the positions of objects, combined with the geographical locations of the camera devices 140(1)-(N), to estimate the time it takes the objects to traverse parts of the venue. For instance, the object re-identification component 120 could estimate the travel time between different points within an airport (e.g., between security checkpoints and gates), based on the time it takes objects to appear in a particular camera (e.g., directed at the front of the line), after appearing in another camera (e.g., directed at the back of the line). Once the object re-identification component 120 has learned the average travel time between camera capture locations and typical traffic flows between camera capture locations, the object re-identification component 120 can use such information to improve the identification of objects within the captured images 125.

For example, the object re-identification component 120 could divide each of the images 125 into a respective plurality of patches. Each patch may generally comprise a distinct, fixed size portion of the respective image. For example, in one embodiment, each patch comprises a 24×12 pixel region of the image. The object re-identification component 120 could then extract color and texture descriptors from each patch. For the extracted texture descriptors, the object re-identification component 120 could apply a dimensionality reduction on the texture descriptors. For example, the object re-identification component 120 could perform a principal component analysis operation to reduce the dimensionality of the texture descriptors.

The object re-identification component 120 could concatenate corresponding patch descriptors from two or more of the camera devices 140(1)-(N), and could apply a coupled clustering algorithm to obtain a codebook of exemplary patch descriptors. The object re-identification component 120 could further use timestamps of images captured by the camera devices 140(1)-(N) to generate a temporal context model. For example, such a model may describe the flow of objects throughout the environment in which the camera devices 140(1)-(N) are deployed and the amount of time it takes for an object to go from one camera capture location to another.

The object re-identification component 120 could then generate a data model that combines time and object appearance descriptors, and could use such a model for object re-identification within the images 125 captured by the camera devices 140(1)-(N). For example, the object re-identification component 120 can consider predictable movement patterns of objects within the physical environment and can use such patterns to disambiguate between objects with otherwise similar appearances. For instance, the object re-identification component 120 could capture images of two similar pieces of luggage using the camera devices 140(1)-(N), and the object re-identification component 120 could determine that the two pieces of luggage are in fact different objects, based on the timestamps of the images 125 that depict the two objects and despite the similar appearance between the two pieces of luggage in the captured images.

As an example, the object re-identification component 120 could determine that the two objects are likely not the same object because the difference in the timestamps of images depicting the two objects is too short, based on the geographic positions in which the camera devices that captured the images and based on the historical travel time of objects between the two geographic positions. For instance, if two camera devices are deployed on opposite sides of an airport and the camera devices capture images of similar looking pieces of luggage within a 1 minute window of time, the object re-identification component 120 could determine that the similar looking objects are in fact different objects because, historically, observed objects took 1 hour to travel between the two camera devices and such a travel time is significantly greater than the 1 minute time difference in which the images were captured. Doing so provides an improved unsupervised learning technique for object re-identification which is capable of accounting for variances in the color subspace across the various camera devices 140(1)-(N).

In one embodiment, the object re-identification component 120 is configured to mitigate occlusions and poor detection alignment by representing visual appearances using codebooks. Codebooks are highly efficient in scenarios when specialized object detectors would fail. While conventional codebook learning approaches are inefficient when there are significant appearance changes between cameras, the object re-identification component 120 may perform a coupled clustering method that generates per-camera codebooks with codewords that correspond across cameras.

Figure 2:
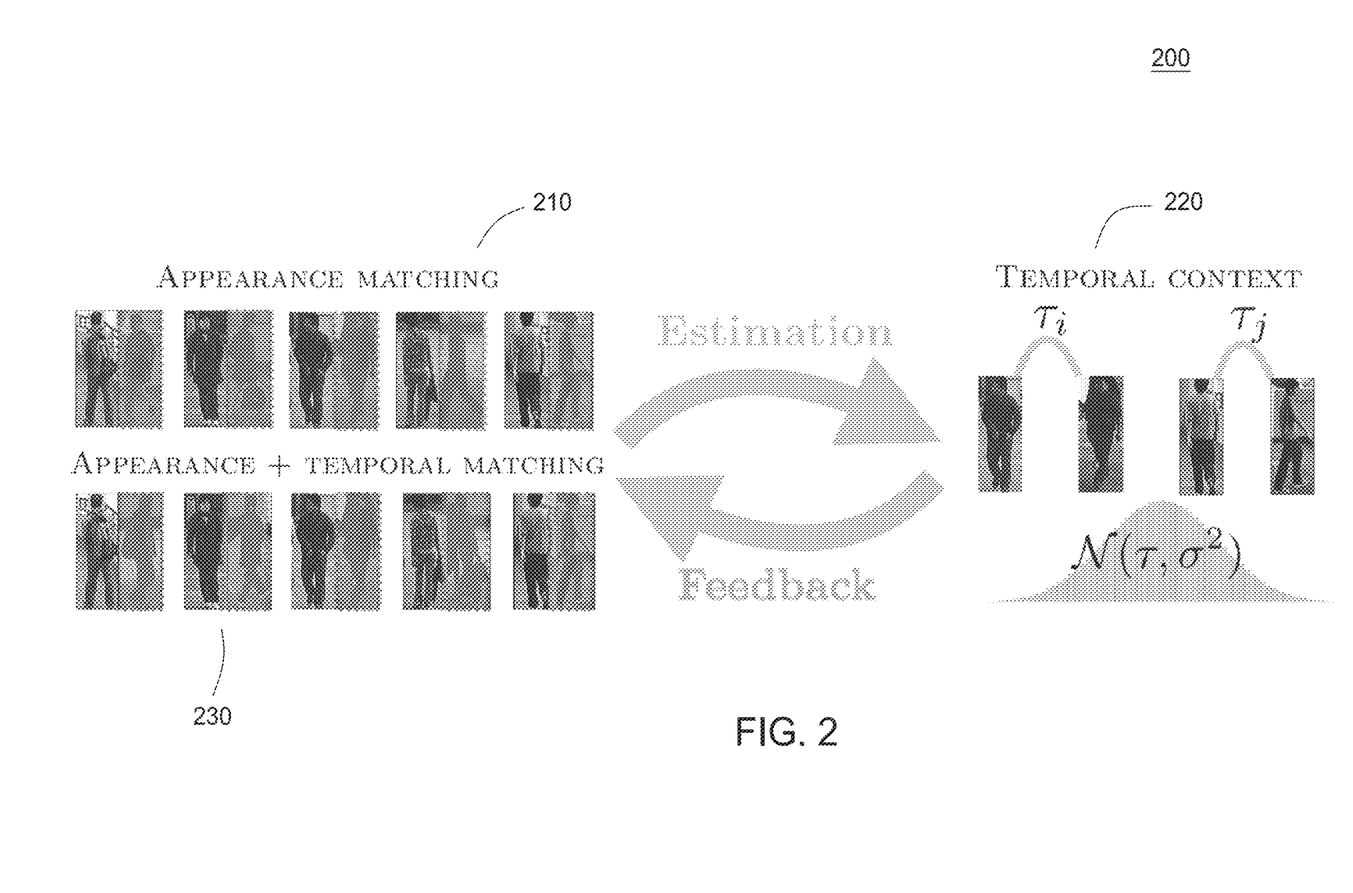
FIG. 2 illustrates a workflow for object re-identification based on temporal context, according to one embodiment described herein.

FIG. 2 illustrates a workflow for object re-identification based on temporal context, according to one embodiment described herein. As shown, the workflow 200 begins with an appearance matching stage 210, where the object re-identification component 120 matches portions of images captured by various camera devices based on the appearance of an object within the portions. For purposes of the following discussion, let A and B denote two cameras in a camera network, where each camera monitors a localized region that objects pass through (e.g., a gate or a doorway). In such an example, the camera A and B may be non-overlapping cameras, such that no portion of the regions captured by the cameras overlap. Suppose there are two bounding boxes $b_i^A$ and $b_j^B$ captured by cameras A and B, respectively, at times $t_i^A$ and $t_j^B$, and that appearance descriptors $x_i^A$ and $x_j^B$ are extracted for each bounding box. These triplets ($o_k=(b_k,t_k,x_k)$) may be referred to herein as observations.

From a Bayesian point of view, object re-identification can refer to the likelihood that observations $o_i^A$ and $o_j^B$ are different images of the same object. In addition to considering the similarity of extracted appearance descriptors, the object re-identification component 120 considers the expected movement patterns of objects within the surveillance environment. As each camera view is focused on a single localized region, the extracted bounding boxes locations are effectively constant across captured images. As such, the object re-identification component 120 may determine the likelihood that two images depict the same object as a product of appearance of similarity and expected travel time between the two locations, as shown in Equation 1.

$$P_{ReID}(o_i^A,o_j^B|i=j) \triangleq \text{Equation 1: Object Re-identification Likelihood}$$

Typically, crowded scenarios (e.g., airports, train stations, etc.) produce detections which are poorly aligned and/or partially occluded. For example, when a given object traverses a localized region being viewed by a camera device, at least a portion of the object may be obscured by another object in front of the given object. The object re-identification component 120 can determine a visual appearance descriptor $x_i$ using a codebook approach. In one embodiment, the object re-identification component 120 trains codebooks on features extracted for correspondences between cameras. The object re-identification component 120 performs a training phase during which training images which are well-aligned are processed. In such a training phase, the object re-identification component 120 may assume that spatially corresponding features represent the same visual appearance under different lighting conditions.

Generally, the object re-identification component 120 converts visual features of captured images into codewords. For example, the object re-identification component 120 could use a bag-of-words (BoW) conversion technique. In this example, $\mathcal{F}=\{f_1, \ldots f_F\}$ represents a set of image features extracted from a set of training data. The image features are high-dimensional vectors (e.g., Scale-Invariant Feature Transform (SIFT) descriptors, concatenated color histograms, etc.) and are typically clustered to produce codewords. For example, $BoW=\{\mu_k:k=1, \ldots, K\}$ could use k-means clustering to define codewords as the centers of the learned clusters. The number of clusters K is the codebook size, and when implementing BoW conversion, the object re-identification component 120 can map each image feature $f_f$ to a codeword k, e.g., using a nearest neighbor lookup technique. In such an embodiment, the object re-identification component 120 produces a descriptor that is a K-dimensional histogram of codeword frequencies.

In a particular embodiment, the object re-identification component 120 uses a Fisher Vector (FV) conversion technique for converting the extracted visual features into codewords. Generally, FV is an extension of BoW conversion, where the distribution of features is modeled by a Gaussian Mixture Model (GMM). For purposes of this discussion, let $FV=\{\mu_k, \Sigma_k, w_k:k=1, \ldots, K\}$ be the parameters of a GMM fitting the distribution of image features, where $w_k$ is the weight of the $k^{th}$ Gaussian with mean $\mu_k$ and covariance $\Sigma_k$. In such an embodiment, an image feature $f_f$ is represented by the gradients of the likelihood of the feature being generated by a certain Gaussian. The gradients can be further computed over both the $\mu$ and $\Sigma$ variables. The object re-identification component 120 may produce a descriptor that is a 2K-dimensional vector.

In one embodiment, the object re-identification component 120 can learn both BoW descriptors and FV descriptors using features from different cameras (e.g., from cameras A and B) by combining them into a single set defined as $\mathcal{F}^{A,B}=\{f_1^A, \ldots, f_{F^A}^A, f_1^B, \ldots, f_{F^B}^B\}$. The object re-identification component 120 then performs clustering on $\mathcal{F}^{A,B}$. If the object re-identification component 120 determines a strong appearance change between the two cameras A and 8, the object re-identification component 120 could use a modified underlying clustering method (e.g., k-means clustering for BoW descriptors, Gaussian mixture model (GMM) for FV descriptors, etc.) such that corresponding features will map to the same cluster even though the features have different appearances due to illumination changes, as a common mapping of image features to codewords in such a situation may not be effective.

Given corresponding features $f^A$ and $f^B$, the object re-identification component 120 can generate $\mathcal{F}^{A|B}=\{(f^A|f^B)_1, (f^A|f^B)_{F^{A|B}}\}$, which refers to the set of concatenated corresponding image features from camera A and camera 8. The object re-identification component 120 could then perform a clustering algorithm on the feature set to obtain data model parameters. For instance, in the case of k-means clustering, the coupled codebook $BoW^{A,B}=\{\mu_{A|B}:k=1, \ldots, K\}$ could be divided into two codebooks $BoW^A=\{\mu_k^A:k=1, \ldots, K\}$ and $BoW^B=\{\mu_k^B:k=1, \ldots, K\}$, by extracting the first and second half of the cluster center dimensions, respectively. As another example, an FV codebook could be split by analogously obtaining two GMM models: $FV^A=\{\mu_k^A: \Sigma_k^A, w_k:k=1,\ldots,K\}$ and $FV^B=\{\mu_k^B, \Sigma_k^B, w_k:k=1,\ldots,K\}$, where the $w_k$ values are shared across the models. In such an embodiment, the appearance transfer function between the various camera devices can be learned implicitly due to the coupled clustering method.

As discussed above, the object re-identification component 120 can be configured to extract appearance representations (e.g., BoW or FV codewords) and to compute the visual appearance dissimilarity between the representations using an $l_2$ norm. For instance, where $x_i^A$ and $x_j^B$ represent extracted appearance representations, the re-identification component 120 could use the dissimilarity measure shown in Equation 2 below.

Equation 2 Visual Appearance Dissimilarity Measure
$$d_{App}^2(x_i^A, x_j^B) = \|x_i^A - x_j^B\|^2$$

The object re-identification component 120 model the temporal context of objects within images captured by the various camera devices at operation 220. In one embodiment, the object re-identification component 120 models the amount of time an object takes to travel between cameras A and B as a normal distribution $\mathcal{N}(\tau,\sigma^2)$. Given the parameters $(\tau, \sigma^2)$ of the distribution and the times $t_i^A$ and $t_j^B$ of the two bounding boxes, the object re-identification component 120 determines the dissimilarity measure between the actual and expected elapsed time using Equation 3, shown below.

Temporal Dissimilarity Measure     Equation 3
$$d_{Time}^2(t_i^A, t_j^B \mid i \equiv j) = \frac{(t_j^B - t_i^A - \tau)^2}{2\sigma^2}$$

In one embodiment, the object re-identification component 120 estimates the parameters of the distribution heuristically using the distribution of typical travel speeds if the path distance between cameras A and B is known. When such information is not available, the re-identification component 120 could use a supervised learning algorithm to estimate the parameter values. For example, given an appearance dissimilarity function $d_{App}(x_i^A, x_j^B)$, the object re-identification component 120 could construct a binary threshold classifier $h(x_i^A, x_j^B) \rightarrow \{0,1\}$ to predict whether observations $o_i^A$ and $o_j^B$ are indeed the same object. The object re-identification component 120 could select the threshold that generates no false positives on the training data, and could use only these observation pairs $(o_i^A, o_j^B)$, e.g., objects with distinctive appearances that can be re-identified reliably, to estimate the parameters $(\tau, \sigma^2)$ of the normal distribution.

In constructing the temporal context model, the object re-identification component 120 can define the cost of inferring that two observations $o_i^A$ and $o_j^B$ correspond to the same object as a weighted sum of appearance dissimilarity and discrepancy from the expected travel time, as shown in Equation 4, which combines the Visual Appearance and Temporal Dissimilarity Measures shown in Equations 2 and 3 with a parameter $\lambda \in [0,1]$ that controls the relative influence of the two factors (i.e., appearance dissimilarity and expected travel time dissimilarity).

Equation 4 Inferred Observation Cost
$$d^2(o_i^A, o_j^B) = \lambda d_{App}^2(x_i^A, x_j^B) + (1-\lambda) d_{Time}^2(t_i^A, t_j^B)$$

The object re-identification component 120 can use such a combined cost function that considers both appearance descriptors and temporal context in the appearance+temporal matching phase 230, shown in FIG. 2. Moreover, as shown, the object re-identification component 120 can continue to refine the model with subsequent appearance descriptor and subsequent temporal context matches.

In one embodiment, the object re-identification component 120 can evaluate each test query $o_j^B$ independently, as shown in Equation 5.

Independent Test Query Evaluation     Equation 5
$$\operatorname*{argmin}_i (-\log P_{ReID}(o_i^A, o_j^B))$$

Upon obtaining the re-identification results (e.g., using Equation 5), the object re-identification component 120 can re-estimate the temporal model parameters. The object re-identification component 120 can take the matching image pairs obtained using the Independent Test Query Evaluation shown in Equation 5, and can analyze a distribution of timestamps corresponding to the images to re-estimate the parameters of the temporal model. The object re-identification component 120 can then compute a new cost function, based on the re-estimated temporal context parameters. The object re-identification component 120 can repeat this process to continually refine the temporal model (e.g., until the object re-identification component 120 determines that each subsequent update to the temporal parameters is insignificantly small).

However, if multiple queries are conducted, it is possible that the object re-identification component 120 will determine that different queries $o_p^B$ and $o_q^B$ have the same best match $o_i^A$ from camera A. That is, the object re-identification component 120 could match multiple observations from one camera with a single observation from another camera. To prevent this, the object re-identification component 120 conduct multiple queries simultaneously (or substantially simultaneously), thereby enforcing mutual exclusion restraints. Doing so ensures each query for an observation from a first camera has a unique matching observation from another camera.

In scenarios where objects are observed while passing through confined regions (e.g., gates or doorways), and there is an expected path between the cameras (e.g., in an airport, where individuals must past through security before proceeding to the gate), the order observed in camera A should be similar to the order observed in camera B. As such, by incorporating temporal context into the cost function and enforcing mutual exclusion constraints, the object re-identification component 120 can implicitly encourage a preference for the preserved ordering to improve the recognition of observations which do not have distinctive appearance descriptors. Given N observations from camera A and M observations from camera B, simultaneous re-identification queries can be formulated as a linear assignment problem, as shown in Equation 6.

Simultaneous Re-identification queries     Equation 6
$$\operatorname*{argmin}_\pi \left( -\sum_{j=1}^M \log P_{ReID}(o_{\pi(j)}^A, o_j^B) \right)$$

In Equation 6, $\pi$ is an M-vector mapping observations from camera B to observations in camera A. In such an embodiment, the linear assignment problem can be encoded into an M×N cost matrix $C=\{c_{ij}\}_{M \times N}$ where $c_{ij}=d^2(o_j^A, o_i^B)$. The object re-identification component 120 could then determine an optimal assignment, e.g., using the Kuhn-Munkres algorithm.

As object re-identification deals not only with significant lighting variations but also with large amounts of occlusion and background clutter, the object re-identification component 120 utilizes a coupled clustering codebook appearance model that accounts for appearance differences between cameras and is robust to both occlusions and alignment errors. Further, the object re-identification component 120 can consider movement patterns in surveillance scenarios by incorporating temporal context, and can be configured to construct such a movement pattern model from observed data. Additionally, the object re-identification component 120 can process simultaneous re-identification queries as a linear assignment problem, thereby substantially maintaining ordering as objects travel between cameras. By utilizing codebooks learned with coupled clustering and temporal context, the object re-identification component 120 provides an improved object re-identification technique that can provide significant performance gains as well as accurate object re-identification.

Figure 3:
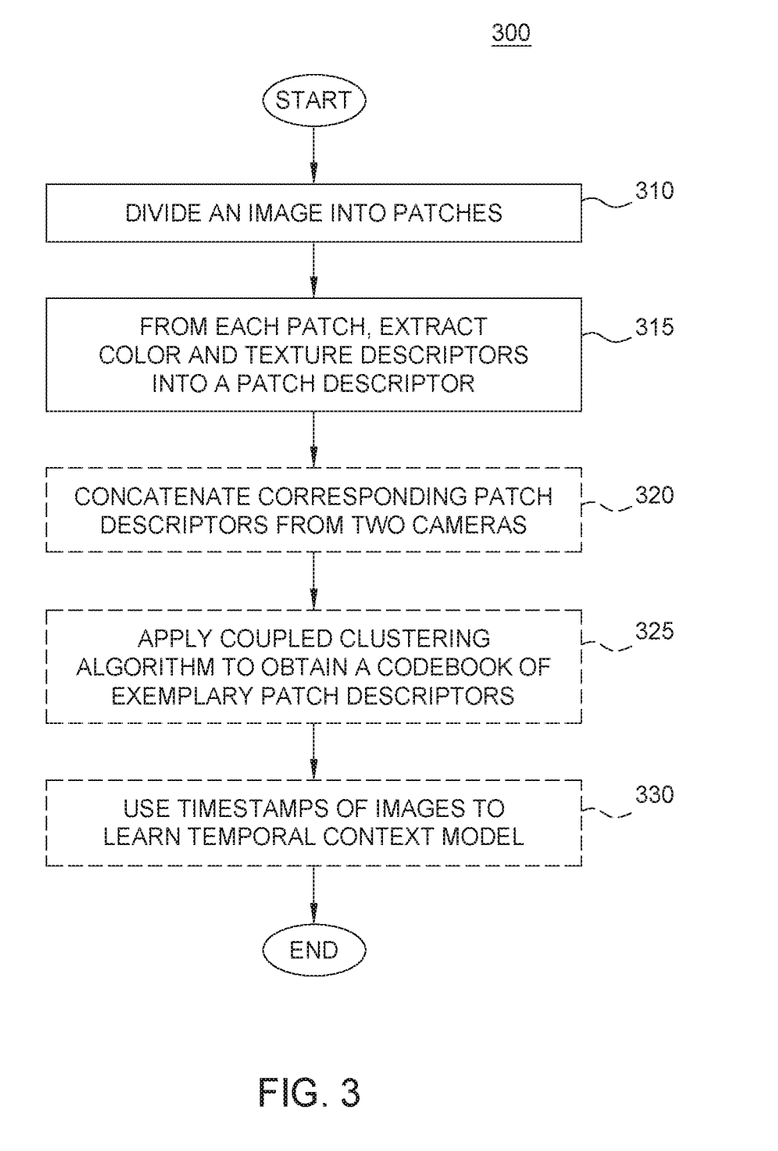
FIG. 3 is a flow diagram illustrating a method of training a temporal-context based object re-identification algorithm, according to one embodiment described herein.

FIG. 3 is a flow diagram illustrating a method 300 of training a temporal-context based object re-identification algorithm. The object re-identification component 120 divides an image into a plurality of patches at operation 310. Each patch generally represents a portion of the image of a predetermined size (e.g., 24 by 12 pixels). From each patch, color and texture descriptors are extracted into a patch descriptor (block 315). That is, the object re-identification component 120 can analyze the pixel values within the portion of the image and can compute the patch descriptor that describes the respective image portion. Corresponding patch descriptors from images captured using two cameras are concatenated (block 320). For example, the training data set could designate the corresponding patch descriptors from the images captured using the two camera devices. As another example, a user could specify the corresponding patch descriptors (e.g., using a graphical user interface).

A coupled clustering algorithm is applied to obtain codebook of exemplary patch descriptors (block 325). The object re-identification component 120 could use a clustering algorithm such a k-means clustering (e.g., in the case of BoW descriptors) or GMM clustering (e.g., in the case of FV descriptors) to obtain the model parameters. The object re-identification component 120 could calculate the visual dissimilarity measure between the various patch descriptors using Equation 2. The object re-identification component 120 uses timestamps of the images captured using the two camera devices to learn a temporal context model (block 330), and the method 300 ends.

Figure 4:
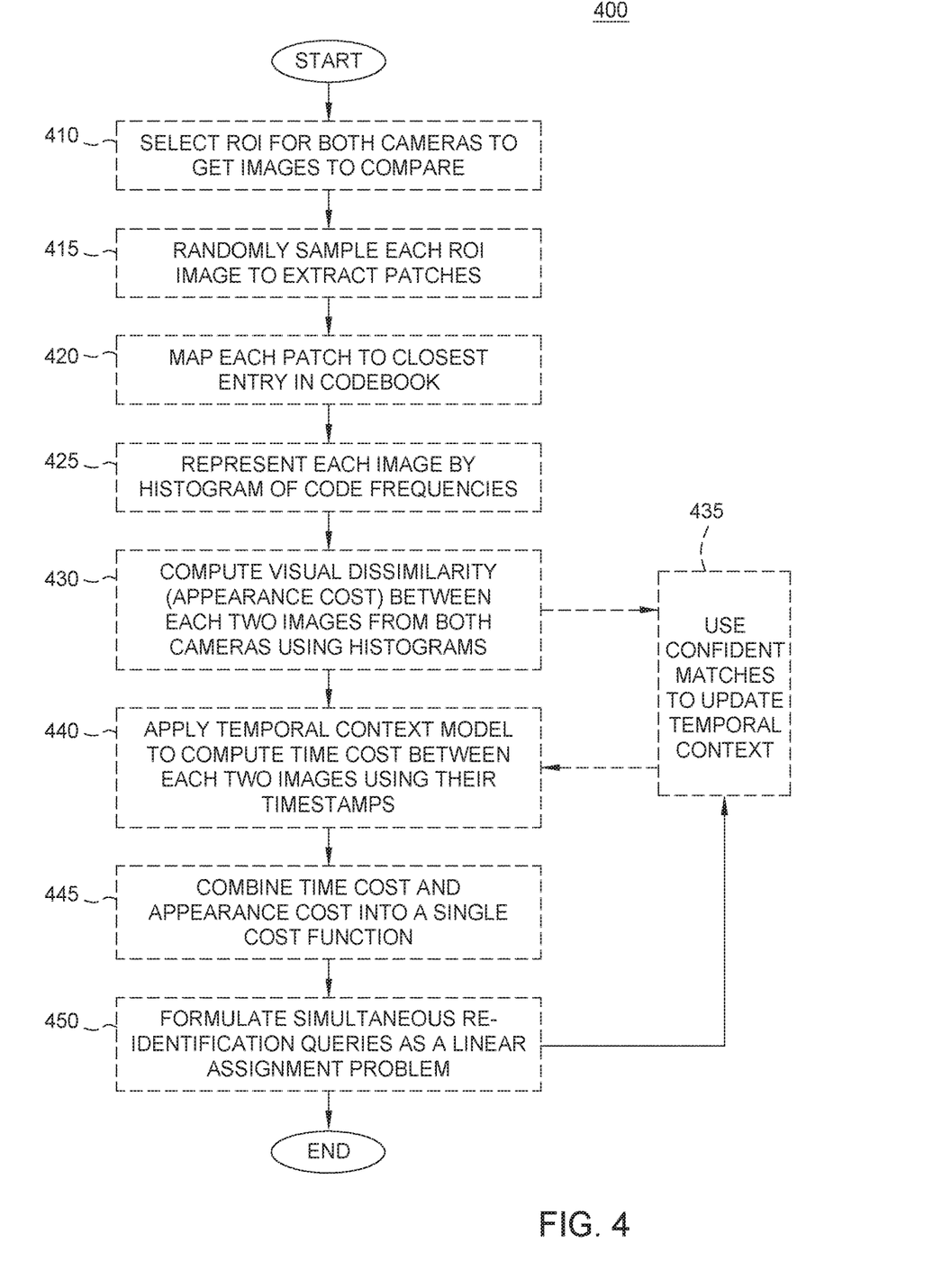
FIG. 4 is a flow diagram illustrating a method of object re-identification based on temporal context, according to one embodiment described herein.

FIG. 4 is a flow diagram illustrating a method 400 of object re-identification based on temporal context. The object re-identification component 120 selects a region of interest for each of two cameras to compare at operation 410. The selected region of interest can depend on the location being surveilled and the position and viewing angle of the camera device. The object re-identification component 120 can provide a graphical user interface through which a user can manually specify the region of interest for one or more of the camera devices.

The object re-identification component 120 randomly samples each region of interest and, from each region of interest, the object re-identification component 120 extracts a plurality of patch descriptors at operation 415. In one embodiment, the object re-identification component 120 divides the region of interest into 24 by 12 pixel patches, but more generally, any patch size can be used, consistent with the functionality described herein. Each patch descriptor is mapped at operation 420 to a closest entry in the codebook generated during the training process. The object re-identification component 120 could conduct a training process using the method 300 shown in FIG. 3.

Once each patch descriptor has been mapped to the closest codebook entry, a histogram of code frequencies representing each image is generated at block 425. At block 430, the object re-identification component 120 computes a measure of visual dissimilarity (i.e., an appearance cost) between each of two images from the two cameras using the generated histograms. The object re-identification component 120 determines a confidence value for each of the measures of visual dissimilarity and, for measures having a confidence value above a predefined threshold amount of confidence, uses the measures to update the temporal context model (block 435).

At operation 440, the object re-identification component 120 uses the temporal context model to compute a time cost between each of the two images, using the corresponding timestamps of the two images. The computed time cost and appearance cost are combined into a combined single cost function (block 445). Using the combined single cost function at block 450, the object re-identification component 120 formulates simultaneous object re-identification queries as a linear assignment problem. Additionally, the method 400 can return block 435 to refine the temporal context model. For instance, the object re-identification component 120 can continually refine the temporal context model. In one embodiment, the object re-identification component 120 iteratively refines the temporal context model until each iteration results in an insignificant amount of change to the temporal model (e.g., when the object re-identification component 120 determines that the amount of change is less than a predefined threshold amount of change).

An example of such a linear assignment function is shown above in Equation 6. Generally, the object re-identification component 120 can then use the linear assignment function to re-identify objects appearing in images captured using cameras in the network of cameras, based not only on the appearance of the objects within the captured images but also based on the temporal context of the images.

Figure 5:
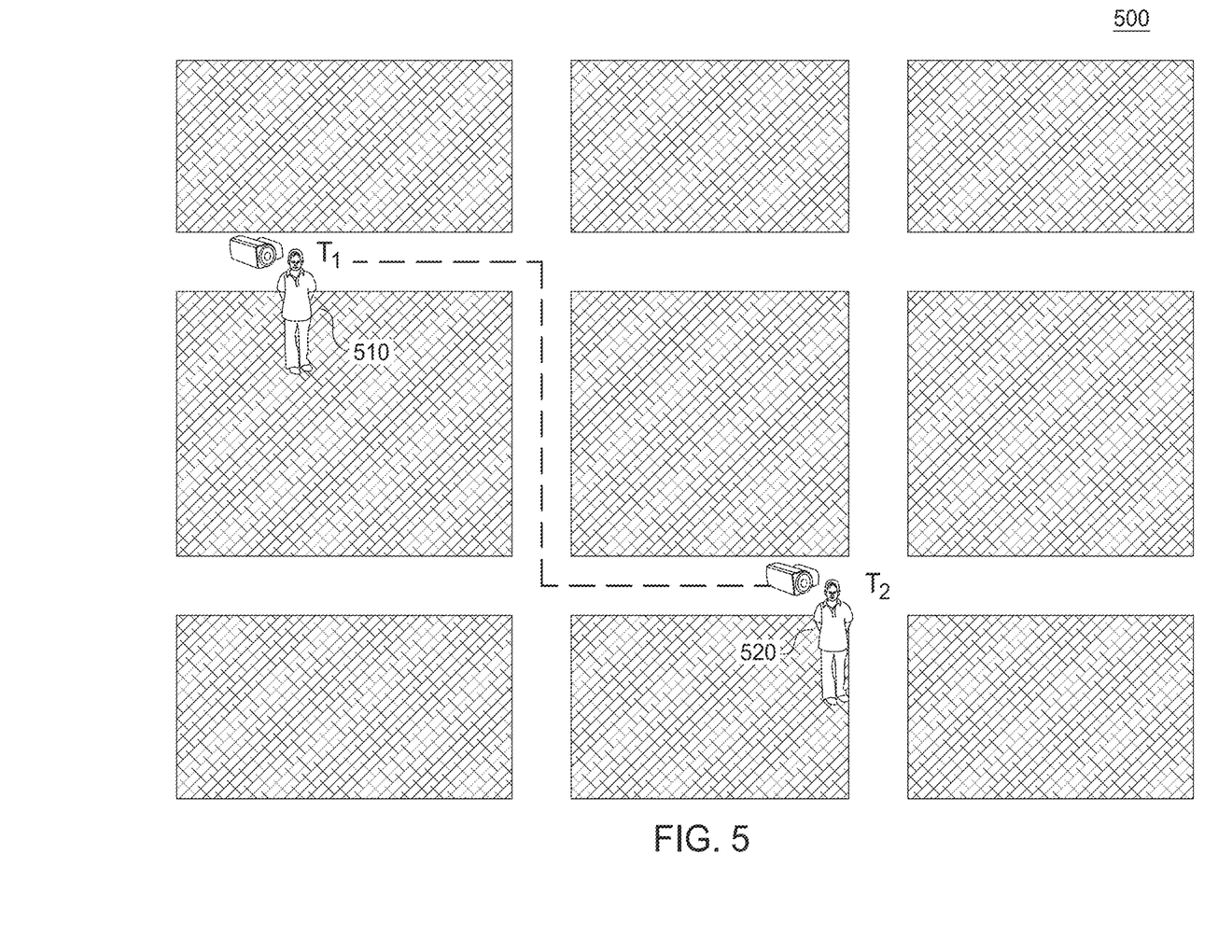
FIG. 5 illustrates a map showing movement of an object throughout of a geographic location over a period of time, according to one embodiment described herein.

FIG. 5 illustrates a map showing movement of an object throughout of a geographic location over a period of time, according to one embodiment described herein. The object re-identification component 120 can process map data describing a layout of a geographical location (e.g., an airport, a train station, etc.) as well as the general flow of objects within the geographical location. Additionally, the object re-identification component 120 can access data specifying the typical travel speeds (e.g., walking speeds of individuals) between various points within the geographical location. Such map data could specify, for the map 500, that objects appearing at the position 510 typically move in the manner shown by the dotted line, and ultimately move past the camera at position 520. In such an example, the object re-identification component 120 could retrieve data specifying an average travel time of objects between the positions 510 and 520. In the depicted example, the object has been captured in an image at the position 510 at a time $T_1$, and captured in an image at position 520 at a time $T_2$. The object re-identification component 120 could then use the retrieved information specifying the average walking time between positions 510 and 520, to construe the amount of time between the timestamps $T_1$ and $T_2$ of the images captured of the object at positions 510 and 520. The object re-identification component 120 can also be configured to heuristically estimate the travel speeds, e.g., using a supervised learning approach.

Figure 6:
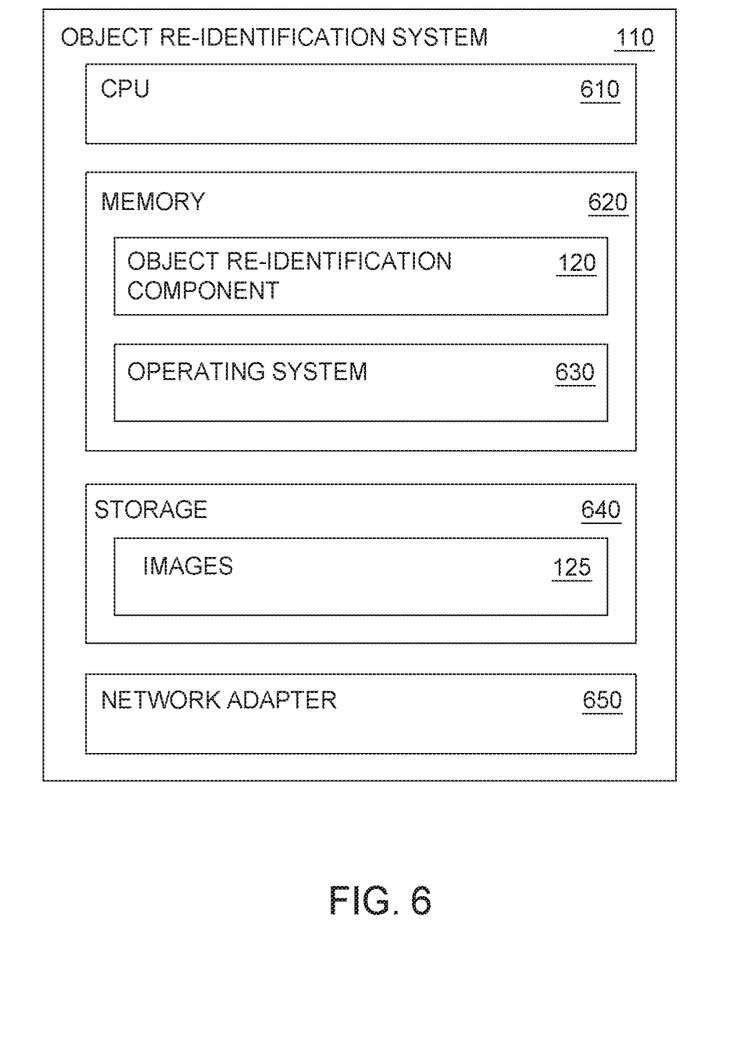
FIG. 6 is a block diagram illustrating a system configured to execute an object re-identification component, according to one embodiment described herein.

FIG. 6 depicts one architecture of a system 600 within which embodiments of the present disclosure may be implemented. This figure in no way limits or is intended to limit the scope of the present disclosure. System 600 may be a desktop computer, video game console, digital assistant, rendering engine, or any other device suitable for practicing one or more embodiments of the present disclosure.

As shown, system 600 includes a central processing unit (CPU) 610, a memory 620, storage 640 and a network adapter 650. CPU 610 includes one or more processing cores, and, in operation, CPU 610 is the master processor of system 600, controlling and coordinating operations of other system components. The system memory 620 stores software applications and data for use by CPU 610, and as shown, the memory 620 includes the object re-identification component 120 and an operating system 630.

Storage 640 represents non-volatile storage for applications and data and may include fixed or removable hard disk drives, flash memory devices, and CD-ROM, DVD-ROM, Blu-ray, HD-DVD, or other magnetic, optical, or solid state storage devices. The storage 640 (which can be connected to the CPU 610 via an I/O bridge, not shown) may be configured to store content and applications and data for use by CPU 610. As shown, storage 640 contains images 125, which represent images captured from cameras 140(1)-(N).

Network adapter 650 allows the system 600 to communicate with other systems via an electronic communications network, and may include wired or wireless communication over local area networks and wide area networks such as the Internet. For example, the images 125 can be received over a data communications network by the network adapter 650 from the cameras 140(1)-(N) and stored in the storage 640, e.g., until analyzed by the object re-identification component 120.

In the preceding, reference is made to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The preceding flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of object identification, the computer-implemented method comprising:
    capturing, with a first camera at a first point in time, a first image depicting a first scene;

capturing, with a second camera at a second point in time different from the first point in time, a second image depicting a second scene that does not overlap with the first scene;

extracting a first patch from the first image;

extracting a second patch from the second image;

extracting a first patch descriptor from the first patch;

extracting a second patch descriptor from the second patch;

mapping the first and second patch descriptors to a concatenated codeword in a clustered codebook learned via coupled clustering of a set of concatenated features, wherein at least one concatenated feature of the set of concatenated features is generated by concatenating corresponding patch descriptors from the first and second cameras, the concatenated codeword comprising dimensions of cluster centers of coupled clusters to which the first and second patch descriptors map;

computing an appearance cost comprising a measure of visual dissimilarity between the first and second images, based on the concatenated codeword and by operation of one or more computer processors;

computing a temporal cost between the first and second images, using a temporal context model and based on the first and second points in time;

combining the appearance cost and the temporal cost into a single cost function; and determining whether the first and second images depict a common object, using the single cost function, after which an indication of whether the first and second images depict a common object is output.

2. The computer-implemented method of claim 1, further comprising:

splitting the clustered codebook into a plurality of codebooks, wherein each of the plurality of codebooks is specific to a respective one of the first and second cameras.

3. The computer-implemented method of claim 2, wherein the codebook specific to the first camera comprises a first plurality of codebook entries, wherein the codebook specific to the second camera comprises a second plurality of codebook entries.

4. The computer-implemented method of claim 3, wherein the mapping is performed using one of bag-of-words conversion techniques and Fisher Vector conversion techniques.

5. The computer-implemented method of claim 3, further comprising:

generating a first histogram representing the first image, using the first plurality of codebook entries; and generating a second histogram representing the second image, using the second plurality of codebook entries.

6. The computer-implemented method of claim 5, wherein the appearance cost is computed based further on the first and second histograms.

7. The computer-implemented method of claim 1, further comprising:

determining a measure of confidence for the measure of visual dissimilarity between the first and second images.

8. The computer-implemented method of claim 1, wherein determining whether the first and second images depict a common object comprises:

formulating a plurality of simultaneous object re-identification queries as a linear assignment problem.

9. The computer-implemented method of claim 1, further comprising:

performing a training algorithm to generate the temporal context model for the first and second cameras.

10. The computer-implemented method of claim 9, further comprising:

retrieving a mapping data structure specifying at least one of (i) an average walking time between the first and second cameras, (ii) a distance between the first and second cameras, (iii) a path between the first and second cameras, and (iv) an average walking speed between the first and second cameras.

11. The computer-implemented method of claim 9, further comprising:

learning a distribution of temporal dissimilarity measures using a supervised learning approach.

12. The computer-implemented method of claim 11, wherein learning the distribution of temporal dissimilarity measures using the supervised learning approach further comprises:

constructing a binary threshold classifier to predict whether observations between the first and second cameras depict a same object;

selecting a plurality of observations, between the first and second cameras, depicting a same object and having a threshold that generates a number of false positives that is less than a predefined threshold number of false positives; and using the plurality of observations to estimate parameters of the distribution of temporal dissimilarity measures.

13. The computer-implemented method of claim 1, further comprising:

dividing the first image into a plurality of patches including the first patch, wherein each of the plurality of patches comprises a respective, unique 24-pixel by 12-pixel region of the first image.

14. The computer-implemented method of claim 13, wherein each of the first and second patch descriptors comprises a color descriptor and texture descriptor.

15. A method, comprising:

extracting, from a first image corresponding to a first camera device and a second image corresponding to a second camera device, a first plurality of patch descriptors and a second plurality of patch descriptors, respectively;

computing a measure of visual similarity between the first image and the second image, based on the first plurality of patch descriptors and the second plurality of patch descriptors and by operation of one or more computer processors;

computing a temporal cost between the first image and the second image, based on a first timestamp at which the first image was captured and a second timestamp at which the second image was captured;

combining the measure of visual similarity and the temporal cost into a single cost function;

determining a measure of confidence for the measure of visual similarity between the first image and the second image;

upon determining that the measure of confidence exceeds a predefined threshold level of confidence, updating a temporal context model based on the first timestamp and the second timestamp;

determining whether the first image and the second image depict a common object, using the single cost function; and continuing to refine the temporal context model over time, until an amount of change from each refinement is less than a threshold amount of change.

16. A non-transitory computer-readable medium containing computer program code executable to perform an operation for object identification, the operation comprising:

capturing, with a first camera at a first point in time, a first image depicting a first scene;

capturing, with a second camera at a second point in time different from the first point in time, a second image depicting a second scene that does not overlap with the first scene;

extracting a first patch from the first image;

extracting a second patch from the second image;

extracting a first patch descriptor from the first patch;

extracting a second patch descriptor from the second patch;

mapping the first and second patch descriptors to a concatenated codeword in a clustered codebook learned via coupled clustering of a set of concatenated features, wherein at least one concatenated feature of the set of concatenated features is generated by concatenating corresponding patch descriptors from the first and second cameras, the concatenated codeword comprising dimensions of cluster centers of coupled clusters to which the first and second patch descriptors map;

computing an appearance cost comprising a measure of visual dissimilarity between the first and second images, based on the concatenated codeword and by operation of one or more computer processors when executing the computer program code;

computing a temporal cost between the first and second images, using a temporal context model and based on the first and second points in time;

combining the appearance cost and the temporal cost into a single cost function; and determining whether the first and second images depict a common object, using the single cost function, after which an indication of whether the first and second images depict a common object is output.

17. A computer-implemented method to facilitate object identification, the computer-implemented method comprising:

extracting a first patch descriptor from a first image depicting a first scene captured by a first camera device;

extracting a second patch descriptor from a second image depicting a second scene captured by a second camera device, wherein the first and second scenes are non-overlapping, wherein each of the first and second images has a respective timestamp;

concatenating corresponding patch descriptors from the first and second camera devices into at least a concatenated patch descriptor of a set of concatenated patch descriptors;

generating, by operation of one or more computer processors, a clustered codebook based on coupled clustering of the set of concatenated patch descriptors, the clustered codebook including a concatenated codeword, the concatenated codeword comprising dimensions of cluster centers of coupled clusters that the concatenated patch descriptor maps to; and generating a temporal context model based on the respective timestamp of each of the first and second images, wherein based on the clustered codebook and the temporal context model, an appearance cost and a temporal cost between a subsequent plurality of images are computed and combined into a single cost function, wherein based on the single cost function, the subsequent plurality of images is determined to depict a common object.

18. The computer-implemented method of claim 17, further comprising:

splitting the clustered codebook into a plurality of codebooks, wherein each of the plurality of codebooks is specific to a respective one of the first and second camera devices.

19. The computer-implemented method of claim 18, further comprising:

determining a measure of confidence for a measure of visual similarity between the first and second images; and upon determining that the measure of confidence exceeds a predefined threshold, updating the temporal context model based on the timestamps of the first and second images.

20. The computer-implemented method of claim 17, wherein an indication that the subsequent plurality of images depicts the common object is output.

* * * * *

UNITED STATES PATENT AND TRADEMARK OFFICE
CERTIFICATE OF CORRECTION

Page 1 of 2

PATENT NO. : 11,055,538 B2
APPLICATION NO. : 15/476230
DATED : July 6, 2021
INVENTOR(S) : Michal Koperski et al.

It is certified that error appears in the above-identified patent and that said Letters Patent is hereby corrected as shown below:

On the Title Page

In item (56), in Column 2, under "Other Publications", Line 3, delete "Conf," and insert -- Conf. --, therefor.

In item (74), in Column 2, in "Attorney, Agent, or Firm", Line 1, delete "Sheridan." and insert -- Sheridan, --, therefor.

On the Page 2, in Column 2, under "Other Publications", Line 37, delete "(http://" and insert -- <http:// --, therefor.

In the Specification

In Column 5, Line 58, delete "$P_{ReID}(o_i^A, o_j^B | i{=}j) \triangleq$ Equation 1 Object Re-identification Likelihood" and insert -- $P_{ReID}(o_i^A, o_j^B | i{=}j) \triangleq P_{App}(x_i, x_j | i{=}j) P_{Time}(t_i, t_j | i{=}j)$ Equation 1 - Object Re-identification Likelihood --, therefor.

In Column 6, Line 46, after "$\{f_1^A, \ldots\}$" insert -- , --.

In Column 6, Line 50, delete "8," and insert -- B, --, therefor.

In Column 6, Line 59, after "$\{(f^A | f^B)_1,$" insert -- . . . --.

In Column 6, Line 61, delete "8." and insert -- B. --, therefor.

In Column 7, Line 3, delete "$\{\mu_k^A:$" and insert -- $\{\mu_k^A,$ --, therefor.

Signed and Sealed this
Seventh Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,055,538 B2

In Column 7, Line 13, delete "l$_2$" and insert -- $\ell_2$ --, therefor.

In Column 7, Line 18, delete "$d_{App}^2(x_i^A, x_j^B | i \equiv j) = \| x_i^A - x_j^B \|_2^2$ Equation 2 - Visual Appearance Dissimilarity Measure" and insert
-- $d^2_{App}(x_i^A, x_j^B | i \equiv j) = \| x_i^A - x_j^B \|_2^2$ Equation 2 - Visual Appearance Dissimilarity Measure --, therefor.

In Column 7, Line 63, delete "$d^2(o_i^A, o_j^B) = \lambda d_{App}^2(x_i^A, x_j^B) + (1-\lambda) d_{Time}^2(t_i^A, t_j^B)$ Equation 4 - Inferred Observation Cost" and insert
-- $d^2(o_i^A, o_j^B) = \lambda d^2_{App}(x_i^A, x_j^B) + (1-\lambda) d^2_{Time}(t_i^A, t_j^B)$ Equation 4 - Inferred Observation Cost --, therefor.

In the Claims

In Column 15, Lines 38-39, in Claim 16, delete
"determiningwhetherthefirstandsecondimagesdepictacommonobject,usingthe" and insert
-- determining whether the first and second images depict a common object, using the --, therefor.